Oct. 4, 1932.  G. H. CURTISS  1,880,844
ROAD VEHICLE BODY STRUCTURE
Filed June 8, 1928   2 Sheets-Sheet 1
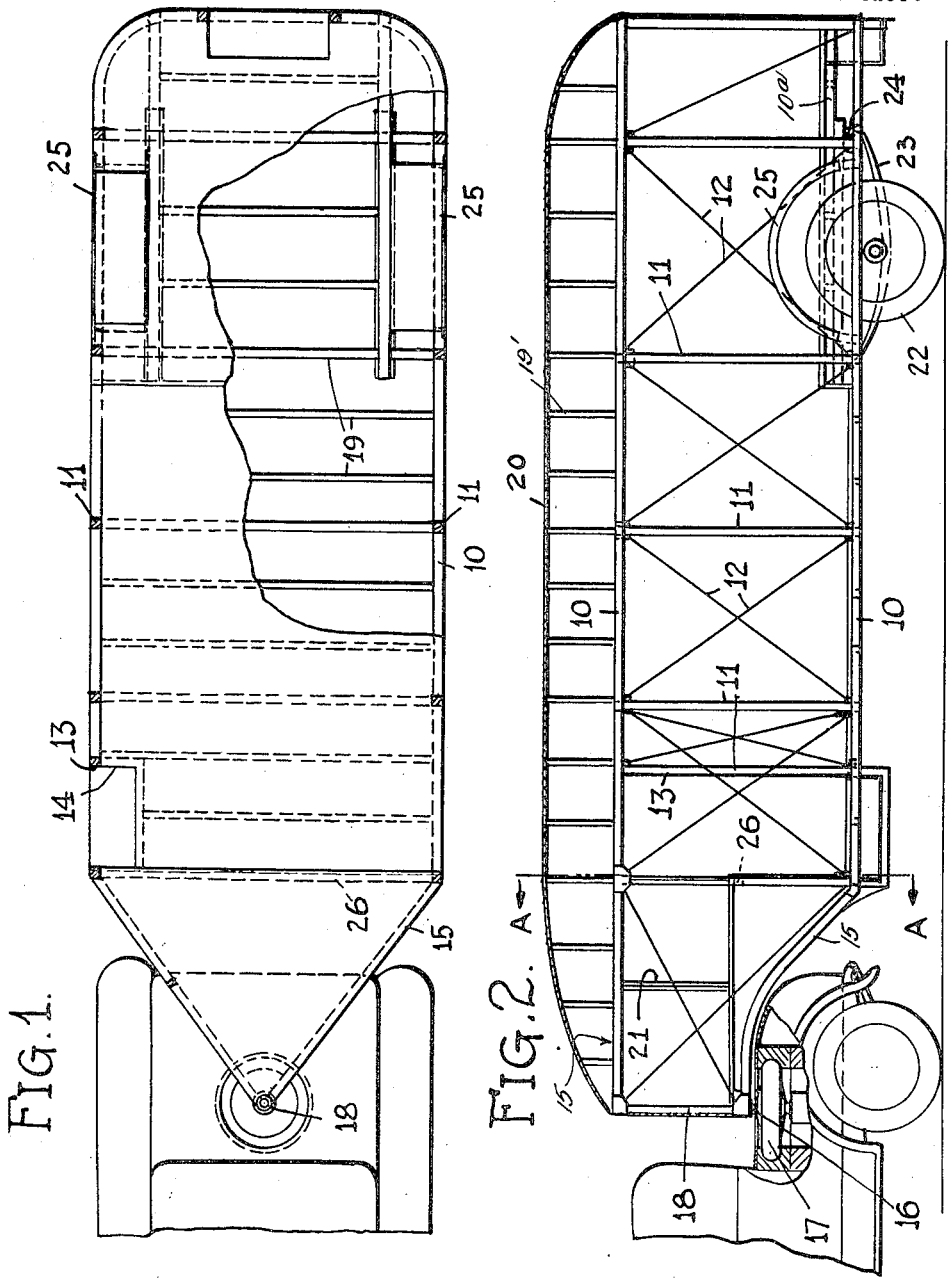
INVENTOR.
GLENN H. CURTISS.
BY W. Braes Jr.
ATTORNEY.

Oct. 4, 1932.   G. H. CURTISS   1,880,844
ROAD VEHICLE BODY STRUCTURE
Filed June 8, 1928   2 Sheets-Sheet 2
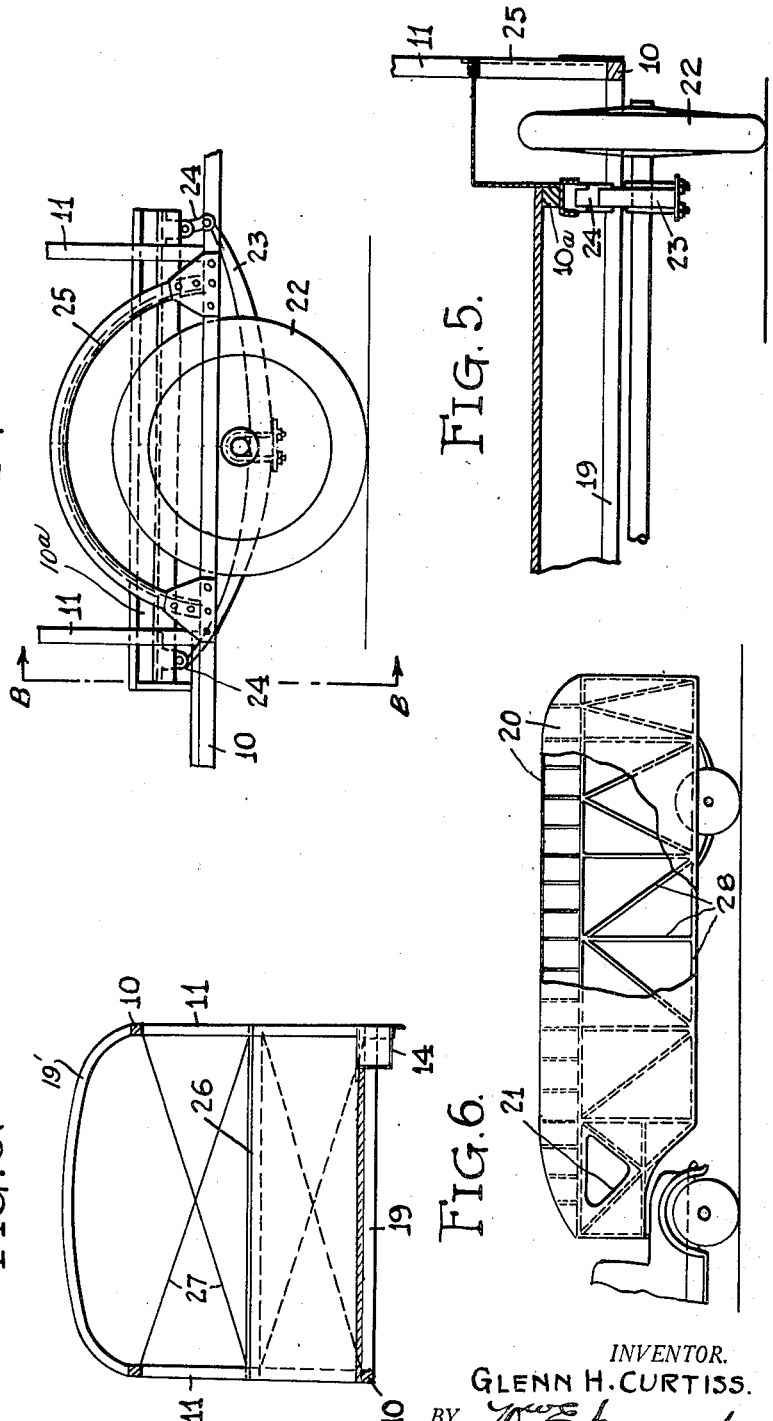
INVENTOR.
GLENN H. CURTISS.
BY
ATTORNEY.

Patented Oct. 4, 1932

1,880,844

UNITED STATES PATENT OFFICE

GLENN H. CURTISS, OF COUNTRY CLUB ESTATES, FLORIDA, ASSIGNOR TO THE AEROCAR CORPORATION, OF WILMINGTON, DELAWARE, A CORPORATION OF DELAWARE

ROAD VEHICLE BODY STRUCTURE

Application filed June 8, 1928. Serial No. 283,880.

My invention relates to road or rail vehicles, and more particularly to such vehicles as are drawn by power units separate from the said vehicle itself.

An object of the invention is to provide a simplified trailer unit in which there is no chassis, as distinguished from the body structure itself.

A further object of the invention is to provide a trailer vehicle of such constructional features as to reduce its manufacturing cost below that entailed in producing the conventional chassis-body structure now in use.

The present invention further provides of a novel arrangement of the structural members of the trailer unit, so that, to carry the same or equivalent useful load, the resulting vehicle is very considerably lighter than any trailer built according to present practice.

A further object of the invention is to provide a vehicle which is inherently safer in its operation than the ordinary trailer.

A still further object of the invention is to provide a type of structural arrangement which permits of more economical transportation of merchandise, passengers, and the like, by virtue of its greater carrying capacity for a stipulated gross weight, and by reason of the decreased tractive effort required to draw it.

A still further object of the invention is to provide a vehicle in which the riding qualities are greatly improved.

Other and further objects of the invention will be hereinafter pointed out.

In the drawings, wherein like reference characters denote like or corresponding parts:

Fig. 1 is a plan view with parts broken away and partly in section, showing a preferred construction and arrangement of the trailer vehicle;

Fig. 2 is a side elevation of the trailer with the covering removed and showing the manner in which the wheels are attached to the composite body structure, and the method of coupling the unit to the power source;

Fig. 3 is a transverse section of the trailer at A—A of Fig. 2;

Fig. 4 illustrates, in detail, the attachment of the wheels to the structure;

Fig. 5 is a transverse section at BB of Fig. 4 and

Fig. 6 is a diagrammatic illustration of an optional type of structural design embodying welded steel tubular construction.

In the embodiment of my invention selected for illustration, there is shown a trailer vehicle especially designed for transporting passengers and/or light merchandise. This trailer vehicle comprises a unitary body frame supported at three points. Near the rearward part of the frame it is carried directly by the road wheels, no load carrying chassis being provided or required to be used. Adjacent to its forward end, the body frame is supported directly by means of a resilient and pivoted coupling to a tow car.

The resilient coupling with the tow unit may be of any suitable design, but preferably that which is shown in Figs. 1 and 2, and which is more fully disclosed in my patent application Serial Number 283,881 filed concurrently herewith.

In order that the supporting chassis may be dispensed with, the unitary body frame mentioned above as being supported directly upon the two rear wheels, comprises a unitary longitudinally continuous box girder composed of truss members suitably braced. Upon this frame there may be attached suitable side covering, roof and floor. Doors and windows may be provided in the frame and in the side covering therefor as desired.

Referring particularly to Figs. 1 and 2 of the drawings, my improved trailer is shown as comprising a frame made up of two longitudinally extending generally U-shaped chord members 10, arranged one at the bottom and one adjacent to the top of the trailer unit and extending continuously along the sides thereof and around the rear portion. The two chords 10 are connected by vertical members or uprights 11 suitably fastened at intervals to said chords 10, and by diagonally extending crossed tension members or braces 12 which may be of piano wire if desired. The chord members 10 and the uprights 11 may be of wood if desired. The body sides, in each instance, thus constitute longitudinally continuous trusses of a vertical depth sufficient to support and distribute adequately the maximum loads, which it is intended that the trailer shall carry. The forward ends of both the upper and lower longitudinally U-shaped members are continued to form special chord members 15, which converge forwardly to the vertical bow post 18. Vertically beneath the bow post 18 the trailer unit is connected directly by a king bolt or coupling pin 16 to the resilient coupling 17, illustrated as a pneumatic tire. If desired, the king bolt 16 may be, as shown, a continuation of the bow post 18. As shown more clearly in Fig. 2 the lower special chord member 15 is bent generally upward and thence forwardly from the main part of the lower chord member 10 to the king pin 16, in order to provide an overhang for the tow car and so that the king pin may be supported at a convenient height upon the tow car and yet the trailer vehicle retained in a proper attitude and at the proper height from the ground. If desired, each of the chord members 10 may be made of a plurality of sections. For instance they may be divided at the rear end of the trailer and/or at the intersection of the main portions with the portion 15.

I also provide transversely extending upper and lower frame members of the box girder frame. Arranged perpendicular to the longitudinally extending portions of the lower U-shaped chord member 10 and joining the said longitudinally extending portions are transverse horizontal beams 19 which serve also as floor joists for the trailer vehicle. Similarly joining the longitudinal portions of the upper U-shaped chord member 10 are transverse beams 19' which serve also as supports for the roof covering of the vehicle. The beams 19' may be bowed, as shown more clearly in Fig. 3, and if desired both the upper and the lower horizontal cross beams 19 and 19' may be strengthened by the addition of diagonally crossed tension members extending horizontally between the points of connection of the said beams 19 and 19' with the U-shaped chord members 10. These cross bracing tension members may be similar to the members 12 and may be made, if desired, of piano wire.

I provide additional bracing adjacent to the front of the trailer vehicle. In the vertical plane in which the converging members 15 depart from the plane of the main part of the chord members 10 and substantially in the horizontal plane of the king pin, there is disposed a horizontal cross brace 26 (see Fig. 3) for joining the members 11 at that point, and diagonal cross tension members 27 are fastened to the junction points of the members 10, 11, 26, 19 and 19' in order to aid in carrying the torsional loads set up within the structure. The cross tension members 27 are duplicated above and below the brace 26 and flooring extends from the brace horizontally forward to the bow post 18 to provide a compartment which may be used for baggage if desired.

As stated above, I fasten the wheels directly to the body frame. To this end, I may build integral with the body frame a box-like structure such as is shown more particularly in Figs. 1, 4 and 5. Horizontally extending supplementary frame members 10a are secured parallel to and slightly above the plane of the lower U-shaped chord member 10. The frame members 10a may be fastened to suitable vertical connecting uprights supported from the body frame as shown in Figs. 2 and 4. Fastened to the supplementary frame members 10a are the spring shackles 24 of the springs 23, the springs 23 being secured in any desired manner to wheels 22 so that the weight of the trailer vehicle is transmitted directly to said wheels from the supplementary frame members 10a of the box girder. The shackles 24 may be attached to the main body truss members 10 and transmit the loads directly into the body truss by this means or if desired, the wheels 22 may be inset as shown and attached to auxiliary body truss members 10a which form in effect a part of the truss members 10 and transmit the loads directly by means thereof.

Any suitable guard, such as 25, may be used around the wheel or an enclosing well built into the structure.

Suitable light weatherproof covering for the sides and top of the trailer vehicle may be provided as shown at 20 and a suitable floor may be fastened to the floor joists 19. The covering and the floor are not intended or required to either carry or distribute any portion of the operating loads. Doors at one or both sides and/or at the rear of the trailer vehicle may be provided. That the side truss may not be weakened, the doorway may be framed in by an underslung frame portion 14 and an additional vertical side frame member 13, the former being reentrant and extending below the lower U-shaped chord member 10 in order to provide a step for passengers entering the trailer. A window 21 may be provided at any convenient point if desired.

While the present preferred embodiment of my invention discloses a braced structure of struts and wires as performing the functions of both chassis and body structure as found in the trailer now known to the art, other optional arrangements are, of course, contemplated within the scope of my invention. Fig. 6 is diagrammatically illustrative of one such optional arrangement, in which the top and bottom and side trusses are formed of welded steel tubes 28.

The above detailed description of my invention will readily indicate the advantages to be found by the use thereof. The elimination of the chassis, as distinguished from the body structure, and the use of a single trussed structure to perform the functions of both, enables my trailer to be built much more lightly than is possible with any other type of structure. I am able to attain the needed strength while reducing the weight of the structure because of the extreme beam depth available in the load carrying trusses, which enable them to be built in the lightest possible manner.

The inherent lightness of the structure, as hereinabove set forth, provides for greater carrying capacity, lower tractive power requirements, and speedier transportation, as may be readily understood by those familiar with the art.

A further advantage is that the unit construction embodied in the invention readily lends itself to cheap mass production of the article.

It will be further understood that inasmuch as the body covering does not assist in the carrying and distribution of the loads present in the structure, said covering may be of light material and made to serve as a sound insulator, thus insuring practically noiseless transportation in the trailer.

The invention is particularly valuable as it adds to the safety of the passengers: first, by reason of the fact that a trailer tends to prevent skidding of the tow car; and secondly, by the fact that the passengers are in this strong body structure which is not likely to collapse or break up if turned over; and thirdly, the passengers being well to the rear of the vehicle, are in a safer position than riding forward in a four wheel vehicle.

While I have described my invention in its present preferred embodiment, and have. disclosed the objects and advantages thereof, it will be obvious to those skilled in the art after understanding my invention, that various changes and modifications may be made therein without departing from the spirit or scope thereof. I aim in the appended claims to cover all such modifications and changes.

What is claimed is:

1. For use in combination with a power vehicle; a trailer vehicle comprising a body structure having its sides constructed in the form of light trusses, said trusses being connected at top and bottom by transverse members forming with the trusses a box girder of substantially the full length, depth and width of the body, wheels secured to the girder adjacent the rear end, the forward ends of the lower chords of the trusses being extended upwardly and forwardly and converge to form a point of attachment to the power vehicle, said girder being entirely self supported between said point of attachment and said wheels.

2. For use in combination with a power vehicle; a trailer vehicle comprising a body structure having its sides constructed in the form of light trusses, said trusses being connected at top and bottom by transverse members forming with the trusses a box girder of substantially the full length, depth and width of the body, wheels secured to the girder adjacent the rear end, the forward ends of the upper chords of the trusses being converged and the forward ends of the lower chords of the trusses being converged, to form a prow, the converging ends of the lower chords being bent upwardly and forwardly to provide a point of attachment to the power vehicle, said girder being entirely self supported between said point of attachment and said wheels.

3. For use in combination with a power vehicle; a trailer vehicle comprising a body structure having its sides constructed in the form of light trusses, said trusses being connected at top and bottom by transverse members forming with the trusses a box girder of substantially the full length, depth and width of the body, wheels secured to the girder adjacent the rear end, the forward ends of the upper chords of the trussses being converged and the forward ends of the lower chords of the trusses being converged to form a prow and attached to opposite ends of a prow post, the converging ends of the lower chords being bent upwardly and forwardly to provide a point of attachment to the power vehicle at the lower end of said post, said girder being entirely self supported between said point of attachment and said wheels.

In testimony whereof I hereunto affix my signature.

GLENN H. CURTISS.